United States Patent
Humphreys et al.

(10) Patent No.: US 9,591,390 B2
(45) Date of Patent: Mar. 7, 2017

(54) FIXTURE HOUSING FOR RECESSED SPEAKER

(71) Applicants: Tyler Humphreys, Henderson, NV (US); Jeremy Burkhardt, Henderson, NV (US); Ken Humphreys, Henderson, NV (US); Edward Haase, Henderson, NV (US)

(72) Inventors: Tyler Humphreys, Henderson, NV (US); Jeremy Burkhardt, Henderson, NV (US); Ken Humphreys, Henderson, NV (US); Edward Haase, Henderson, NV (US)

(*) Notice: Subject to any disclaimer, the term of this patent is extended or adjusted under 35 U.S.C. 154(b) by 137 days.

(21) Appl. No.: 14/511,135

(22) Filed: Oct. 9, 2014

(65) Prior Publication Data

US 2016/0105738 A1 Apr. 14, 2016

Related U.S. Application Data

(60) Provisional application No. 61/888,925, filed on Oct. 9, 2013.

(51) Int. Cl.
*H04R 1/02* (2006.01)
*F16B 13/04* (2006.01)

(52) U.S. Cl.
CPC ............... *H04R 1/021* (2013.01); *F16B 13/04* (2013.01); *H04R 2201/021* (2013.01); *H04R 2201/025* (2013.01)

(58) Field of Classification Search
CPC ........ H04R 1/021; H04R 1/025; H04R 1/323; H04R 1/345; H04R 2400/13; H04R 2201/021

USPC ............... 381/332, 336, 345, 386, 387, 395; 181/150, 199; 362/147, 364, 365
See application file for complete search history.

(56) References Cited

U.S. PATENT DOCUMENTS

| | | |
|---|---|---|
| 3,518,420 A | 6/1970 | Kripp |
| 4,048,491 A | 9/1977 | Wessman |
| 4,250,540 A | 2/1981 | Kristofek |
| 4,293,895 A | 10/1981 | Kristofek |
| 4,431,151 A | 2/1984 | Schonasky |
| 4,673,149 A | 6/1987 | Grote et al. |
| 4,733,339 A * | 3/1988 | Kelsall ................... F21V 21/04 362/365 |
| 4,739,460 A | 4/1988 | Kelsall |
| 5,377,088 A | 12/1994 | Lecluze |
| 5,609,414 A | 3/1997 | Caluori |

(Continued)

*Primary Examiner* — William A Jerez Lora
(74) *Attorney, Agent, or Firm* — Kirk A. Buhler; Buhler & Associates (57) ABSTRACT

Improvements in a fixture housing for recessed speaker or lighting that can be installed from one side of a wall or ceiling is disclosed. Once the ideal location is identified an installer uses a hole saw to cut an opening in the desired location. The fixture housing can then be pushed into the opening. The fixture housing for recessed speaker includes a plurality of engaging tabs that allows an installer to simply lift the speaker into the fixture housing for recessed speaker, and then turn the speaker within the fixture to lock the speaker within the fixture housing for recessed speaker. The securing tabs fold inward to clear the hole opening and then fold back out where the securing ears are brought down onto the back side of the opening to clamp the fixture to the wall or ceiling and secure the fixture.

19 Claims, 6 Drawing Sheets

(56) References Cited

U.S. PATENT DOCUMENTS

| | | | |
|---|---|---|---|
| 5,941,625 A | 8/1999 | Morand | |
| 6,026,927 A | 2/2000 | Burdett et al. | |
| 6,070,694 A | 6/2000 | Burdett et al. | |
| 6,101,262 A | 8/2000 | Haase et al. | |
| 6,554,458 B1 | 4/2003 | Benghozi | |
| 6,827,471 B1 | 12/2004 | Benghozi | |
| 6,896,394 B2 | 5/2005 | Houle | |
| 7,178,628 B2 | 2/2007 | Gordon | |
| 7,399,104 B2* | 7/2008 | Rappaport | F21S 8/02 362/147 |
| 7,530,705 B2* | 5/2009 | Czech | F21S 8/02 248/288.11 |
| 7,587,059 B2* | 9/2009 | Wright | H04R 5/02 181/150 |
| 7,997,381 B2 | 8/2011 | Gordon | |
| 9,093,188 B1* | 7/2015 | Holland | H01R 11/00 |
| 9,261,129 B2* | 2/2016 | Herrema | F16L 41/12 |
| 2004/0257818 A1 | 12/2004 | Benghozi | |
| 2005/0045171 A1* | 3/2005 | Wright | H04R 5/02 126/39 R |
| 2005/0123156 A1* | 6/2005 | Wright | H04R 1/025 381/182 |
| 2007/0217207 A1* | 9/2007 | Caluori | F21V 21/043 362/365 |
| 2010/0040254 A1* | 2/2010 | Wright | H04R 1/02 381/395 |
| 2013/0057141 A1* | 3/2013 | Van De Ven | F21S 8/02 313/498 |
| 2015/0010372 A1* | 1/2015 | Herrema | F16L 41/12 411/200 |

* cited by examiner

FIXTURE HOUSING FOR RECESSED SPEAKER

CROSS REFERENCE TO RELATED APPLICATIONS

This application claims the benefit of Provisional Application Ser. No. 61/888,925 filed Oct. 9, 2014 the entire contents of which is hereby expressly incorporated by reference herein.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

Field of the Invention

This invention relates to improvements in a fixture housing for recessed speaker. More particularly, the present fixture housing allows for quick installation of the housing by using a plurality of one-way securing members to connect the housing with the fascia trim.

Description of Related Art including information disclosed under 37 CFR 1.97 and 1.98.

In some home speakers are placed in recessed fixtures, these fixture are often similar to electrical lighting fixtures that are placed in the ceiling as recessed lighting. In this form of lighting a hole is made in the ceiling and a fixture is secured within the hole. Electrical wiring is connected to the fixture and lighting is placed into the recessed fixture to provide lighting that essentially shines downward. In new home construction the fixture is often secured to a horizontal ceiling joist. In other installations the fixture is secured to drywall or sheetrock between the joists where it may or may not be secured to the two adjacent joists. In any of these cases, after installation of the drywall or sheetrock a hole is cut through the sheetrock or drywall and the cosmetic fascia or trim is installed to the recessed fixture. In all installations within a house or building performing the installation is a quick and efficient manner reduces the cost to construct the building or house. While the installation is typically installed in the ceiling, the installation can also be installed in a vertical wall for speakers, controls or other purposes.

A number of patents and or publications have been made to address these issues. Exemplary examples of patents and or publication that try to address this/these problem(s) are identified and discussed below.

U.S. Pat. No. 4,250,540 issued on Feb. 10, 1981 to Paul J. Kristofek discloses a mounting Arrangement for Recessed Light Fixture Housing. To install the invention disclosed in this patent a user pushes the main housing into a hole and then engages clips that are secured with detents on the side of the main housing. While this patent discloses a recessed lighting housing the flange is integrated with the main housing and the electrical connection is from a separate socket that is installed into the top of the main housing.

U.S. Pat. No. 7,399,104 issued on Jul. 15, 2008 to Margaret Rappaport discloses a Universal Trim for Recessed Lighting. This patent uses a series of alternating tabs that grasp the inner and outer walls of a housing to retain the decorative trim plate. While the patent discloses a method of securing and removal of the trim piece, there is no retention of the housing within the hole.

U.S. Pat. No. 3,518,420 issued on Jun. 30, 1970 to R. M Kripp discloses a Recessed Light Fixture. The recessed light fixture uses a series of slots and pins to retain the trim plate onto the housing. The electrical connection is wired directly into the top of the housing. The connection is with slots and pins and requires an installer to have access to both sides of the ceiling to secure the fixture and bezel.

What is needed is a fixture that uses a plurality of one-way securing elements to center and lock the cosmetic bezel to the housing. The proposed fixture housing for recessed speaker provides this solution.

BRIEF SUMMARY OF THE INVENTION

It is an object of the fixture housing for recessed speaker to be installed from one side of a wall or ceiling. Installing the fixture housing for recessed speaker from just one side of a wall allows an installer to install the fixture within a finished house. This significantly increases the ability of the installer to place the fixture in a location that provides the best sound quality as opposed to using a location that provides the best access for the structure of the house and stud/joist locations.

It is an object of the fixture housing for recessed speaker to provide for quick installation that requires just a circular hole saw. An installer can use a stud finder to identify where the stud is located to ensure that the mounting hole is not cut through a stud or joist that is not visible from the installation wall. Once the ideal location is identified the installer uses a standard recessed lighting hole saw to cut an opening in the desired location. The installation of the fixture housing for recessed speaker can then be pushed into the opening for installation without requiring the use of any additional tools or requiring access to the back of the wall, ceiling or floor.

It is another object of the fixture housing for recessed speaker to be configured for speakers. The fixture housing for recessed speaker includes a plurality of engaging tabs that allows an installer to simply lift the speaker into the fixture housing for recessed speaker, and then turn the speaker within the fixture to lock the speaker within the fixture housing for recessed speaker. Wiring can be connected to the speaker prior to installation or can be connected to the speaker after it is installed depending upon the access behind the wall, ceiling or floor.

It is still another object of the fixture housing for recessed speaker to be configured as a single pre-assembled unit. The pre-assembled unit is sold as a single complete housing where an installer simply pushes the housing through the opening. The securing tabs fold inward to clear the hole opening and then fold back out where the securing ears are brought down onto the back side of the opening to secure the fixture. It is also possible for the fixture to be removed by lifting the locking tabs and sliding securing ears where the entire fixture can then be pulled back through the open hole.

Various objects, features, aspects, and advantages of the present invention will become more apparent from the following detailed description of preferred embodiments of

DETAILED DESCRIPTION OF THE INVENTION

Figure 1:
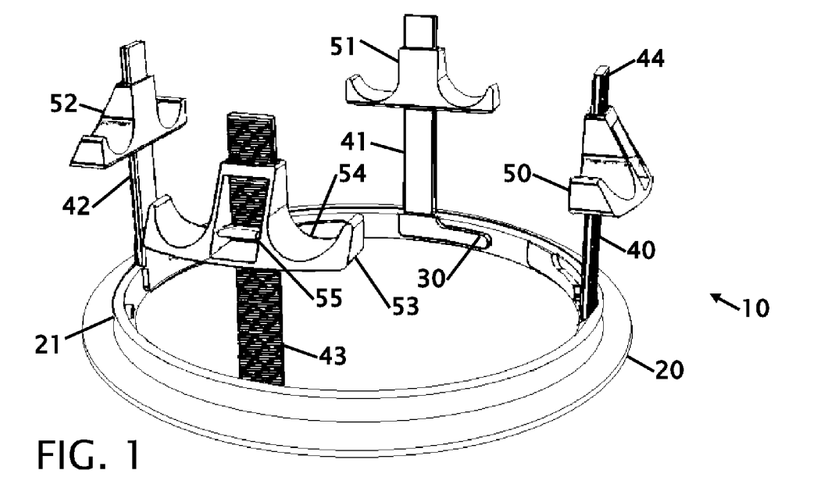
FIG. 1 shows a perspective view of the fixture housing for recessed speaker in free space.

FIG. 1 shows a perspective view of the fixture housing for recessed speaker 10 in free space. This figure shows the fixture housing for recessed speaker 10 prior to installation into a ceiling wall. The fixture housing for recessed speaker 10 has essentially a supporting ring 20 has in internal vertical wall 21 that rises from the supporting ring 20. Upon installation the visible top surface of the supporting ring 20 rests against the visible wall where the fixture housing for recessed speaker 10 is installed. The vertical wall 21 fits within the circular hole opening in the wall or ceiling.

The supporting ring 20 has four retaining arms 40, 41, 42 and 43 extending from the supporting ring. Each retaining arm 40-43 has a smooth inner side that faces into the center of the fixture housing for recessed speaker 10 and a toothed outer surface that faces away from the center of the fixture housing for recessed speaker 10. While the toothed surface is shown on the outer surface it is contemplated that the toothed surface can be on the inside or on both sides. The profile of the toothed surface can be variety of shapes including but not limited to saw tooth, triangular, Acme, sine wave or other shape that has positive locking potential. Each retaining arm 40-43 has a double sided retaining handle 50, 51, 52 and 53. In the preferred embodiment the retaining arms 40-43 and the double sided retaining handles 50-53 are interchangeable but could also be keyed or shaped to connect in only a specific location. The retainer 40 shows that the retainer extending through the double-sided handle 50 to item 44. All of the retaining arms are essentially the same as they extend from the vertical wall 21 to the end of the retaining arms.

Each double sided retainer 50-53 has a locking tab 55 that engages into the respective retaining arm 40-43. Each double sided retainer 50-53 has finger notches 54 that an installer can "feel" to pull down the double sided retainer. This will be shown and described in more detail in the remaining figures. The preferred embodiment shows four retaining arms 40-43 but as few as two to more than four can be used to provide an equivalent end product. Within the inside of the vertical wall 21, the wall has an elongated protrusion 30 where the speaker assembly engages into the fixture housing 10. The engagement is shown and described in more detail in FIGS. 7 and 8.

Figure 2:
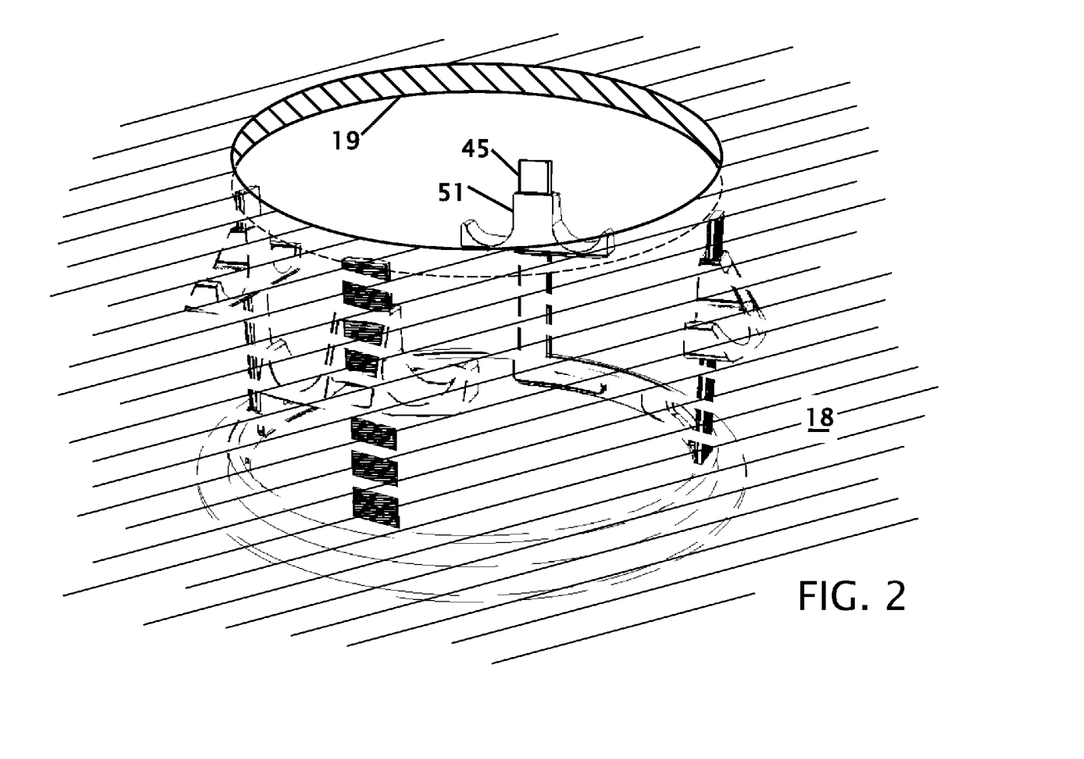
FIG. 2 shows a perspective view of the fixture housing for recessed speaker with a circular hole that accepts the fixture housing for recessed speaker.

FIG. 2 shows a perspective view of the fixture housing for recessed speaker 10 with a circular hole that accepts the fixture housing for recessed speaker, shown looking down from the inside surface 18 where the hole 19 is cut. The retaining arms 40-44 are able to flex along their lengths as well as on the support ring 20 and vertical wall 21. In the natural position the double-sided retaining handles extend over the sides of the hole 19. The retaining arms 40-44 are flexible inward to allow the double sided retainers to clear the inside diameter of the hole 19. The top of one of the retaining arms 45 is visible with one of the double-sided retainers 51 shown through the hole 19.

Figure 3:
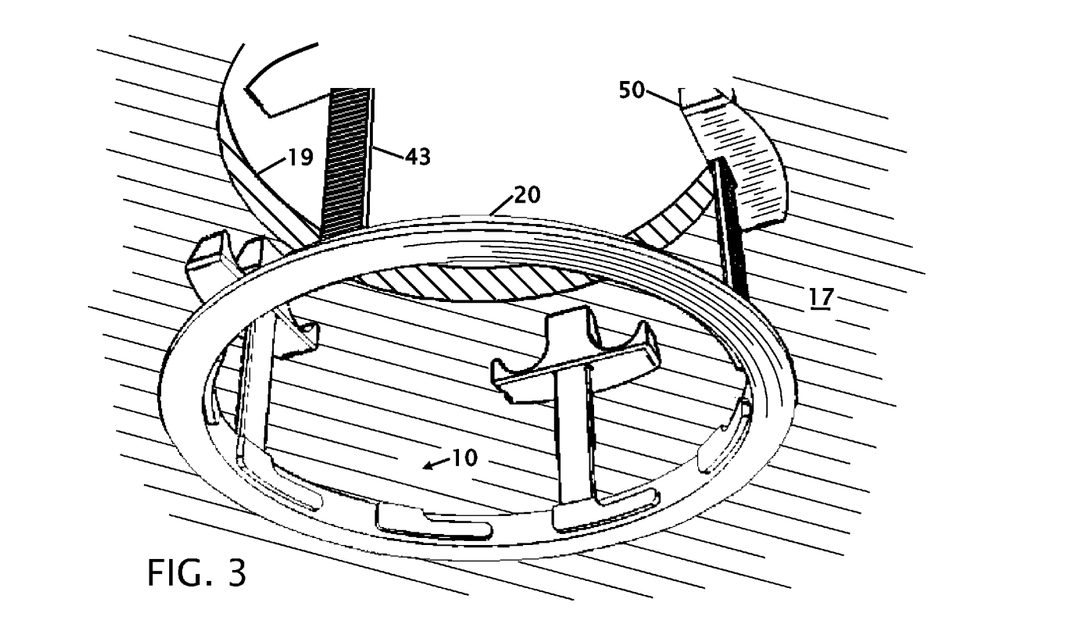
FIG. 3 shows a perspective of the fixture housing for recessed speaker 10 from the inside of the room being moved into the hole.

FIG. 3 shows a perspective from the inside of the room with the fixture housing for recessed speaker 10 being moved into the hole 19 with the surface 17 of the inside wall. It can be seen from this view that the double-sided handles 50 must flex on the retaining arms 43. To clear the inside diameter of the hole 19. The fixture housing for recessed speaker 10 is pushed through the hole such that the support ring 20 makes contact with the surface 17 of the inside wall or ceiling. The retaining arms with the double-side handle(s) 50 will flex back into their natural position on the inside of the wall or ceiling as shown in FIG. 4.

Figure 4:
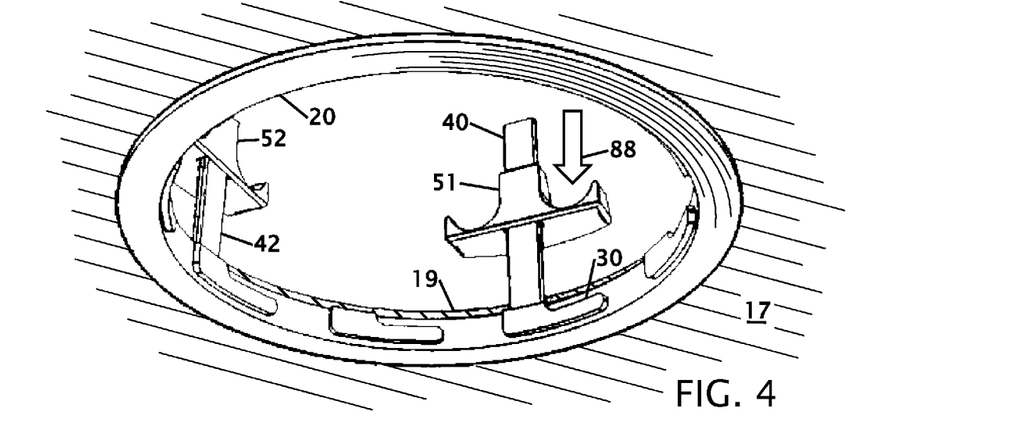
FIG. 4 shows a perspective of the fixture housing for recessed speaker pressed into the installation hole.

FIG. 4 shows a perspective of the fixture housing for recessed speaker 10 pressed into the installation hole 19. After the supporting ring 20 is seated in the hole 19 where the surface of the supporting ring 20 is essentially flat on the outside (visible) surface 17 of the wall or ceiling the double-sided retainers 51 and 52 are brought down 88 along the retaining arms 40 and 42 to surface of the inside of the wall or ceiling. This view also shows the retaining tab(s) 30 for retaining the speaker assembly.

Figure 5:
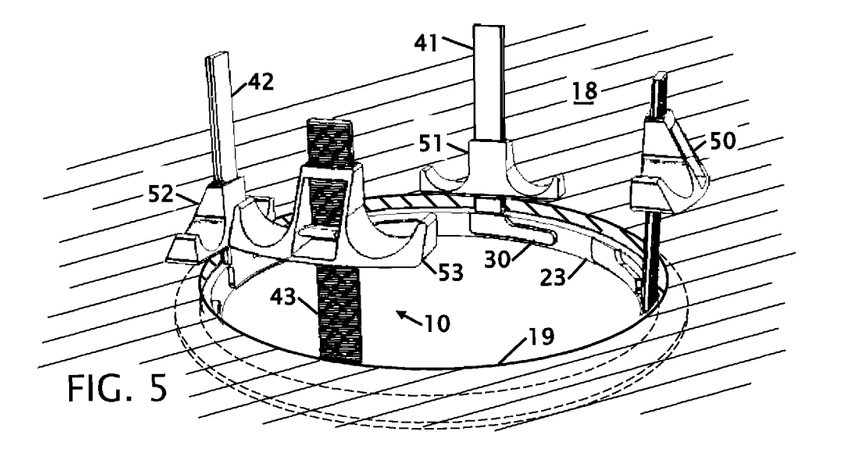
FIG. 5 shows a perspective from behind a wall with some of the retainers of the fixture housing for recessed speaker slid onto the wall.

FIG. 5 shows a perspective from behind a wall with some of the retainers of the fixture housing for recessed speaker 10 slid onto the wall or ceiling through hole 19. This figure shows the surface 18 behind the wall or ceiling. Double-sided retainers 50 and 53 are mid-position on their retaining arms. In this figure two of the double-sided retainers 51 and 52 slid down retaining arms 41 and 42 in contact with the inside surface 18 of the wall or ceiling. This view also shows the retaining tab(s) 30 for retaining the speaker assembly.

Figure 6:
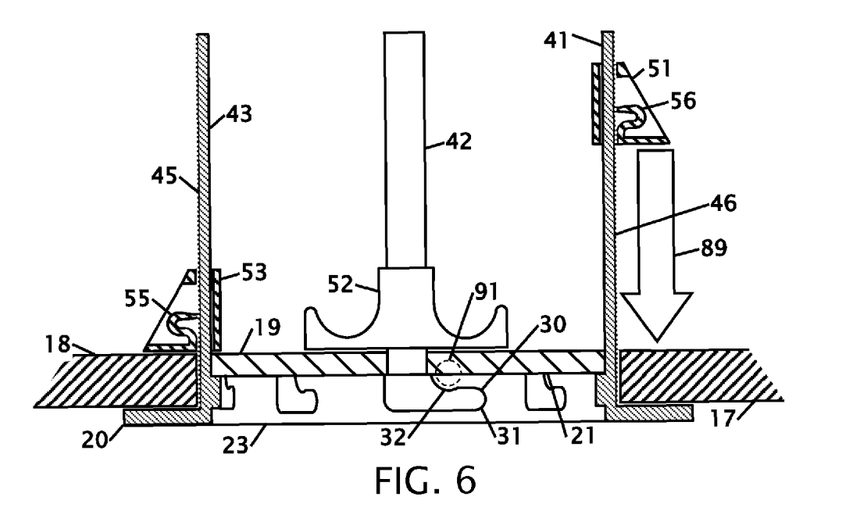
FIG. 6 shows a perspective cross sectional view of the fixture housing for recessed speaker from FIG. 5 cut through opposing retainers.

FIG. 6 shows a perspective cross sectional view of the fixture housing for recessed speaker 10 from FIG. 5 cut through opposing retainers. Once the double-sided retainers 50-53 are against the inside surface 18 (behind the wall or ceiling) of the wall or ceiling the fixture housing for recessed speaker 10 is clamped onto the drywall or sheetrock. This cross-section shows the engaging tang(s) 55 and 56 locking into the toothed surfaces 45 and 46 of the respective retaining arms 41 and 43. Once the double-sided retainers are locked into position by sliding the double sided retainer 51 down 89, they can be released by pulling back on the engaging tangs 55 and 56 where the double-sided retainers can be slid back up the retaining arms.

It is further contemplated that the double-sided retainers can be slid off of the retaining arms. While the double-sided retainers are shown and described in a particular shape and configuration it is contemplated that the double-sided retainers can take a variety of shapes and or configurations to perform the desired clamping on a drywall or sheetrock wall or ceiling.

Figure 7:
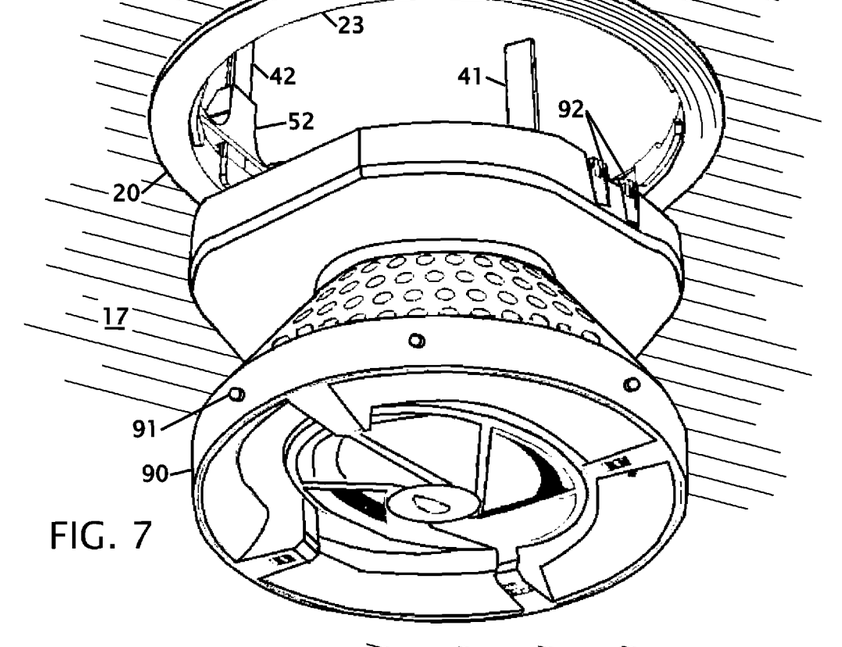
FIG. 7 shows a perspective of a speaker being installed into the fixture housing for recessed speaker.

Once all of the double-sided retainers are clamped onto the drywall or sheetrock the fixture housing for recessed speaker 10 is secured onto the drywall or sheetrock and shown in FIG. 7 where the bosses 91 of the speaker assembly can be engaged into the retaining tabs 30. The bosses 91 from the speaker is raised through the opening between tabs 30 to clear the tip 31 of the tab 30 and then the speaker assembly is rotated to allow the bosses 91 to ride over the tab 30 and drop into an optional recess 32 that locks the speaker assembly within the fixture housing for recessed speaker 10.

FIG. 7 shows a perspective of a speaker being installed into the fixture housing for recessed speaker 10. The fixture housing for recessed speaker 10 shows some of the ends of the retainer arms 41 and 42, with a double-sided retainer 52 clamping the supporting ring 20 on the drywall or sheetrock wall or ceiling 17. Wiring to the speaker assembly 90 is connected to the wiring terminals 92. The speaker assembly 90 is passed into the inside diameter 23 of the fixture housing for recessed speaker. The bosses 91 on the speaker assembly 90 pass between the retaining tabs 30 (not shown in this figure). The speaker assembly 90 is then rotated within the inside diameter 23 of the housing to secure the speaker assembly 90 as shown in FIG. 8.

Figure 8:
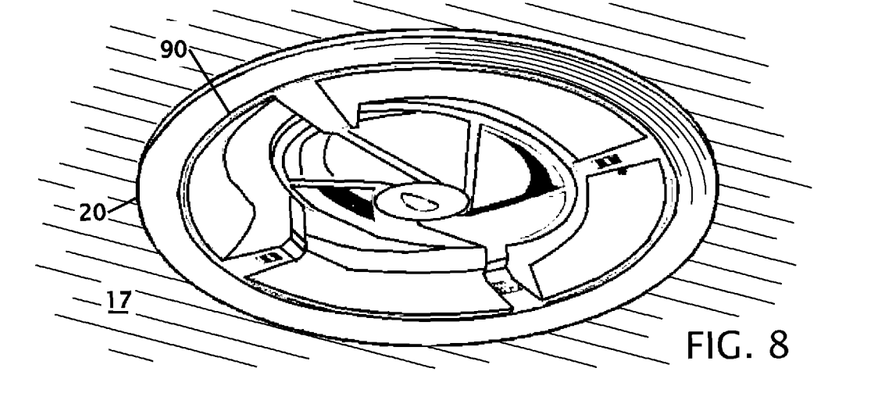
FIG. 8 shows a perspective of a speaker installed into the fixture housing for recessed speaker.

FIG. 8 shows a perspective of a speaker installed into the fixture housing for recessed speaker 10. This image reflects what a user, owner, or person would see when they view the ceiling or wall surface 17. The speaker 90 is shown inside of the supporting ring 20. As previously described, the speaker assembly can be removed by rotating the speaker assembly and pulling the speaker assembly 90 out of the fixture housing.

Figure 9:
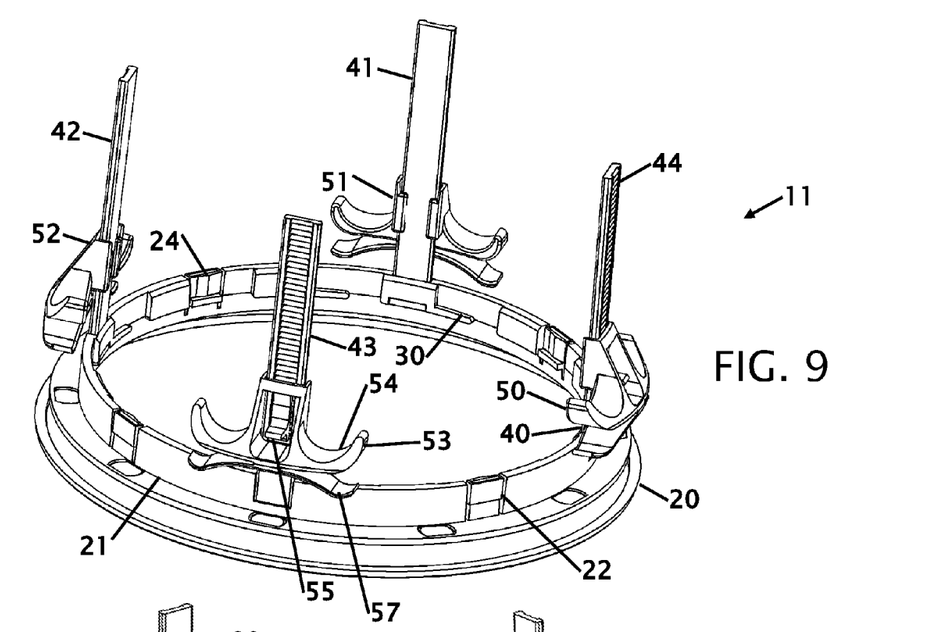
FIG. 9 shows a perspective view of a second preferred embodiment of the fixture housing for recessed speaker
Figure 10:
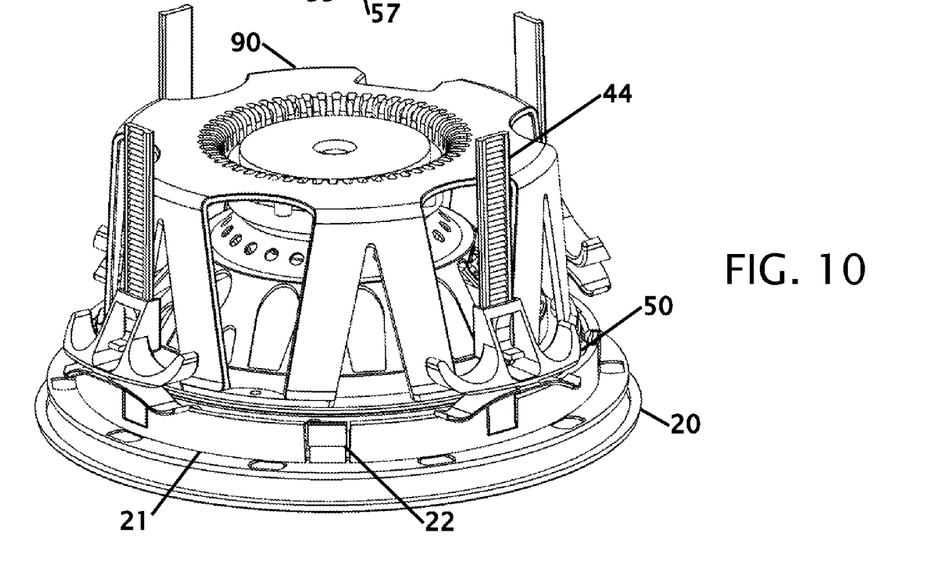
FIG. 10 shows perspective view of the second preferred embodiment of the fixture housing for recessed speaker with a speaker in the housing.

FIG. 9 shows a perspective view of a second preferred embodiment of the fixture housing 11 for recessed speaker, and FIG. 10 shows perspective view of the second preferred embodiment of the fixture housing 11 for recessed speaker with a speaker 90 in the housing 11. In this embodiment the fixture housing for recessed speaker 11 has essentially a supporting ring 20 has in internal vertical wall 21 that rises from the supporting ring 20.

The supporting ring 20 has four retaining arms 40, 41, 42 and 43 extending from the supporting ring. Each retaining arm 40-43 has a smooth inner side that faces into the center of the fixture housing for recessed speaker 10 and a toothed outer surface that faces away from the center of the fixture housing for recessed speaker 11. While the toothed surface is shown on the outer surface it is contemplated that the toothed surface can be on the inside or on both sides. The profile of the toothed surface can be variety of shapes including but not limited to saw tooth, triangular, Acme, sine wave or other shape that has positive locking potential. Each retaining arm 40-43 has a double sided retaining handle 50, 51, 52 and 53. In the preferred embodiment the retaining arms 40-43 and the double sided retaining handles 50-53 are interchangeable but could also be keyed or shaped to connect in only a specific location. The retainer 40 shows that the retainer extending through the double-sided handle 50 to item 44. All of the retaining arms are essentially the same as they extend from the vertical wall 21 to the end of the retaining arms. The bottom of the double sided retainers 50-53 have flexible wings 57 that bend to maintain clamping pressure.

Each double sided retainer 50-53 has a locking tab 55 that engages into the respective retaining arm 40-43. Each double sided retainer 50-53 has finger notches 54 that an installer can "feel" to pull down the double sided retainer. This second embodiment has a plurality of flexible wall member 22 with locking ramps 24 to retain the bosses 91 that are located in the speaker ring (as shown in FIG. 7).

Figure 11:
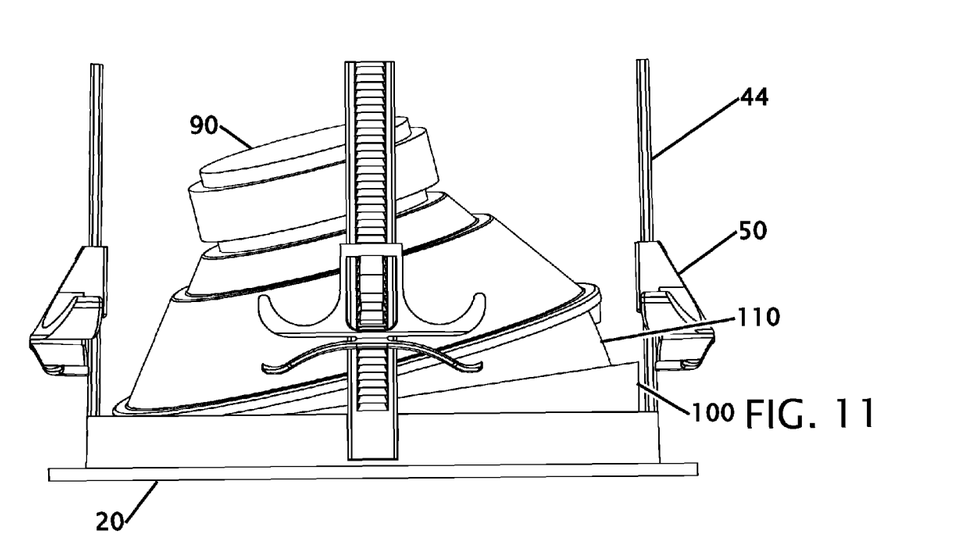
FIG. 11 shows a side plan view of a third preferred embodiment of the fixture housing for recessed speaker using two cams.
Figure 12:
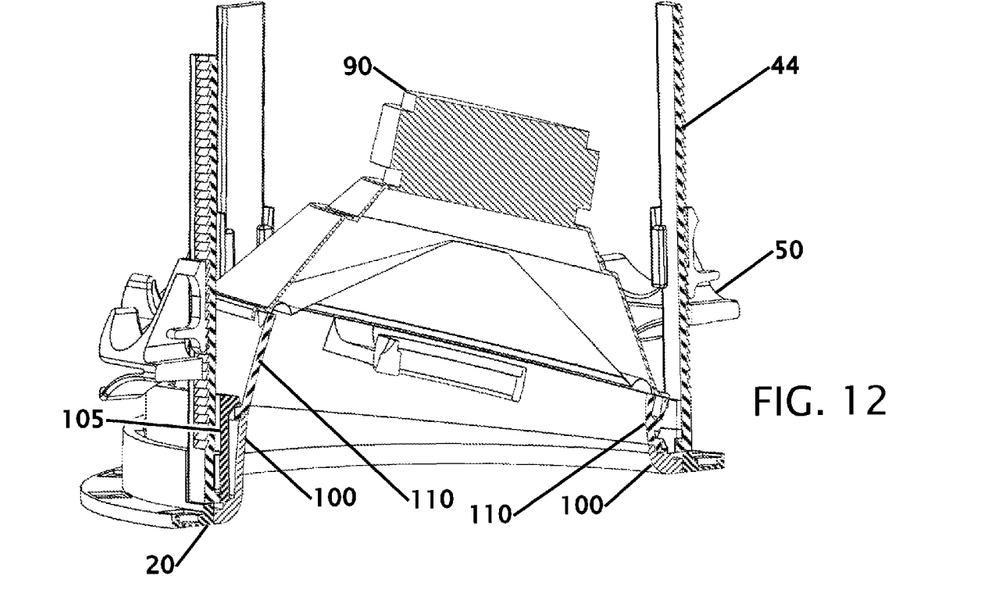
FIG. 12 shows a perspective sectional view of the third preferred embodiment of the fixture housing for recessed speaker using two cams.

FIG. 11 shows a side plan view of a third preferred embodiment of the fixture housing for recessed speaker using two cams and FIG. 12 shows a perspective sectional view of the third preferred embodiment of the fixture housing for recessed speaker using two cams 100 and 110. A retainer 105 allows the two cam parts 100 and 110 to slidably rotate. The two cams 100 and 110 allow the direction of the speaker to be adjusted without requiring removal of the fixture or removal of the speaker 90. The retention mechanism for retaining the speaker within the wall or ceiling is essentially the same with the arms 44 and the handles 50 as previously described herein.

Thus, specific embodiments of a fixture housing for recessed speaker have been disclosed. It should be apparent, however, to those skilled in the art that many more modifications besides those described are possible without departing from the inventive concepts herein. The inventive subject matter, therefore, is not to be restricted except in the spirit of the appended claims.

The invention claimed is:

1. A fixture housing for recessed speaker comprising:
   a supporting ring;
   said supporting ring having an inner vertical wall that extends from said supporting ring and said inner wall is sized to fit within a circular hole cut through sheetrock or drywall;
   said inner vertical wall has a plurality of flexible flat arms extending from said inner wall and parallel with said inner wall;
   said flexible flat arms are secured to said support ring at a first end and are flexible along their length to allow said retainer on each of said flexible flat arm to clear said circular hole and further flex whereby said retainer extends beyond an inside diameter of said circular hole, and
   said flexible flat arms each having a retainer that slides along a respective plurality of arms.

2. The fixture housing for recessed speaker according to claim 1 wherein each said retainer is lockable on each respective flexible flat arm.

3. The fixture housing for recessed speaker according to claim 1 wherein each said flexible flat arm has teeth on one side of said flexible flat arms and are smooth on the opposing side.

4. The fixture housing for recessed speaker according to claim 3 wherein each of said retainers is individually releasable from said respective plurality of flexible flat arms.

5. The fixture housing for recessed speaker according to claim 1 wherein each of said retainers are individually adjustable on each of said flexible flat arms and each said arm further includes flexible wings.

6. The fixture housing for recessed speaker according to claim 3 wherein said plurality of flexible flat arms is at least three flexible flat arms.

7. The fixture housing for recessed speaker according to claim 3 wherein there are four flexible flat arms.

8. The fixture housing for recessed speaker according to claim 1 further includes a retention mechanism for retaining a light.

9. The fixture housing for recessed speaker according to claim 2 further includes a retention mechanism for retaining a speaker wherein said speaker retention mechanism has a plurality of retaining tabs whereby said retention mechanism is sized to fit through said supporting ring, into said inner vertical wall.

10. The fixture housing for recessed speaker according to claim 9 wherein at least one of said plurality of retaining tabs has an enlarged leading edge and a reduced recess.

11. The fixture housing for recessed speaker according to claim 9 wherein said plurality of retaining tabs extend from said inner vertical wall into said circular hole.

12. The fixture housing for recessed speaker according to claim 9 further includes a frame for supporting a speaker.

13. The fixture housing for recessed speaker according to claim 11 wherein said frame for supporting a speaker includes a plurality of elevated bosses.

14. The fixture housing for recessed speaker according to claim 13 wherein at least one of said plurality of elevated bosses is retained in at least one of said recesses.

15. The fixture housing for recessed speaker according to claim 14 wherein said frame is rotated in said supporting ring to engage said elevated bosses in said elevated tabs.

16. The fixture housing for recessed speaker according to claim 1 wherein said retainer extends beyond sides of each of said plurality of flexible flat arms.

17. The fixture housing for recessed speaker according to claim 1 wherein each of said retainers grips sheetrock or drywall between said supporting ring and said retainer.

18. The fixture housing for recessed speaker according to claim 1 further includes a speaker retention mechanism comprising of at least two cammed members that are rotatable relative to each other to alter an angular relationship of said speaker to said support ring.

19. The fixture housing for recessed speaker according to claim 9 wherein each retainer further includes a locking tab that is bendable through said support ring to release said locking tab from said flexible flat arm.

\* \* \* \* \*

UNITED STATES PATENT AND TRADEMARK OFFICE
CERTIFICATE OF CORRECTION

| | | |
|---|---|---|
| PATENT NO. | : 9,591,390 B2 | |
| APPLICATION NO. | : 14/511135 | |
| DATED | : March 7, 2017 | |
| INVENTOR(S) | : Tyler Humphreys et al. | |

It is certified that error appears in the above-identified patent and that said Letters Patent is hereby corrected as shown below:

Claim 1 contains a minor error and will be replaced with the following claim:

Claim 1. A fixture housing for recessed speaker comprising:
a supporting ring;
said supporting ring having an inner vertical wall that extends from said supporting ring and said inner vertical wall is sized to fit within a circular hole cut through sheetrock or drywall;
said inner vertical wall has a plurality of flexible flat arms extending from said inner vertical wall and parallel with said inner vertical wall;
said flexible flat arms each having a retainer that slides along a respective plurality of arms;
and said flexible flat arms are secured to said support ring at a first end and are flexible along their length to allow said retainer on each of said flexible flat arm to clear said circular hole and further flex whereby said retainer extends beyond an inside diameter of said circular hole.

Signed and Sealed this
Twenty-second Day of August, 2017

Joseph Matal
*Performing the Functions and Duties of the*
*Under Secretary of Commerce for Intellectual Property and*
*Director of the United States Patent and Trademark Office*